United States Patent
Mukasa et al.

(10) Patent No.: US 6,545,247 B2
(45) Date of Patent: Apr. 8, 2003

(54) LASER WELDING APPARATUS, A GAS SHIELDING APPARATUS AND A METHOD FOR CONTROLLING A LASER WELDING APPARATUS

(75) Inventors: Koichi Mukasa, Hokkaido (JP); Masayuki Ikeda, Hokkaido (JP); Kazuhisa Sueoka, Hokkaido (JP); Eisuke Ueda, Hokkaido (JP); Hisao Kadono, Hokkaido (JP); Masakazu Mutoh, Hokkaido (JP)

(73) Assignee: Hokkaido University, Sapporo (JP)

( * ) Notice: Subject to any disclaimer, the term of this patent is extended or adjusted under 35 U.S.C. 154(b) by 24 days.

(21) Appl. No.: 09/850,828

(22) Filed: May 8, 2001

(65) Prior Publication Data

US 2002/0003133 A1 Jan. 10, 2002

(30) Foreign Application Priority Data

May 11, 2000 (JP) .......................... 2000-138438

(51) Int. Cl.$^7$ .......................... B23K 26/00; B23K 26/02
(52) U.S. Cl. .......................... 219/121.63; 219/121.83; 219/121.84
(58) Field of Search .......................... 219/121.63, 121.64, 219/121.83, 121.84

(56) References Cited

U.S. PATENT DOCUMENTS

| | | | | |
|---|---|---|---|---|
| 4,121,085 A | * | 10/1978 | Diemer et al. .......... | 219/121.74 |
| 4,621,284 A | * | 11/1986 | Nishioka et al. .......... | 348/135 |
| 4,720,162 A | * | 1/1988 | Mochizuki et al. .......... | 385/11 |
| 4,765,738 A | * | 8/1988 | Henmi .......... | 356/477 |
| 4,998,005 A | * | 3/1991 | Rathi et al. .......... | 219/121.62 |
| 5,106,191 A | * | 4/1992 | Ohtsuka .......... | 356/487 |
| 5,272,312 A | * | 12/1993 | Jurca .......... | 219/121.63 |
| 5,275,327 A | * | 1/1994 | Watkins et al. .......... | 219/124.34 |
| 5,308,951 A | * | 5/1994 | Mori .......... | 219/121.74 |
| 5,329,091 A | * | 7/1994 | Bissinger .......... | 219/121.63 |
| 5,418,350 A | * | 5/1995 | Freneaux et al. .......... | 219/121.64 |
| 5,533,146 A | * | 7/1996 | Iwai .......... | 219/121.63 |
| 5,607,605 A | * | 3/1997 | Musasa et al. .......... | 219/121.63 |
| 6,188,041 B1 | * | 2/2001 | Kim et al. .......... | 219/121.6 |
| 6,301,763 B1 | * | 10/2001 | Pryor .......... | 29/407.04 |
| 6,316,743 B1 | * | 11/2001 | Nagahori et al. .......... | 219/121.67 |
| 6,399,915 B1 | * | 6/2002 | Mori et al. .......... | 219/121.83 |
| 6,411,371 B1 | * | 6/2002 | Hinderling et al. .......... | 356/4.01 |

FOREIGN PATENT DOCUMENTS

| | | | |
|---|---|---|---|
| EP | 1 130 582 A2 | * | 9/2001 |
| GB | 2 163 692 A | * | 3/1986 |
| JP | 56-151191 | | 11/1981 |

(List continued on next page.)

OTHER PUBLICATIONS

U.S. patent application Ser. No. 09/850,839, Koichi Mukasa et al., filed May 8, 2001.
U.S. patent application Ser. No. 09/851,261, Koichi Mukasa et al., filed May 8, 2001.

*Primary Examiner*—Tom Dunn
*Assistant Examiner*—Zidia Pittman
(74) *Attorney, Agent, or Firm*—Knobbe, Martens, Olson & Bear LLP (57) ABSTRACT

A laser welding apparatus includes a laser welding head and a laser welding head position-controlling apparatus. The laser welding head includes a laser irradiating body with an inert gas nozzle to blow off an inert gas for welding parts of members to be welded and at least one shielding gas nozzle, at the outside of the inert gas nozzle, to blow off a shielding gas for the surrounding area of the welding parts, and plural semiconductor lasers to oscillate plural linear laser beams for measuring the welding state of the members to be welded. The laser welding head position-controlling apparatus includes an imaging apparatus with a band-pass filter therein to pass through only the reflected linear laser beams to take in, as an image, the measured welding state by the reflected linear laser beams, and an image processor to process the image of the measured welding state.

12 Claims, 5 Drawing Sheets

FOREIGN PATENT DOCUMENTS

| | | |
|---|---|---|
| JP | 57-130791 | 8/1982 |
| JP | 62-29888 | 2/1987 |
| JP | 63-76785 | 4/1988 |
| JP | 2-99292 | 4/1990 |
| JP | 4-55078 | 2/1992 |
| JP | 5-337662 | 12/1993 |
| JP | 7-51869 | 2/1995 |
| JP | 8-285524 | 11/1996 |
| JP | 11-789 | 1/1999 |
| JP | 11-58063 | 3/1999 |
| JP | 2000-42769 | 2/2000 |

* cited by examiner

FIG. 6

LASER WELDING APPARATUS, A GAS SHIELDING APPARATUS AND A METHOD FOR CONTROLLING A LASER WELDING APPARATUS

BACKGROUND OF THE INVENTION

1. Field of the Invention

This invention relates to a laser welding apparatus, a gas shielding apparatus and a method for controlling a laser welding apparatus.

2. Description of Related Art

A laser welding technique uses a laser beam having a high energy density of $10^5$–$10^6$ W/cm$^2$ equal to that of an electron beam. Since the laser welding technique also uses a rapid heating process and requires only tenth energy power to be put in members to be welded in comparison with other welding techniques, it does not thermally deform the member and almost never thermally influences the member. Therefore, the laser welding technique can precisely weld the member made of a metallic material at a high speed under an atmospheric air. Particularly, in the laser welding technique using a YAG laser, since the YAG laser beams are absorbed into the members to be welded at a high degree, the members can be welded efficiently. And, since the laser beams can be transmitted by an optical fiber, the YAG laser welding technique can have large degree of freedom in its welding position and its welding configuration. In view of the above advantages, the laser welding technique is regarded as a promising welding technique in fabricating a structural body precisely.

However, although the laser welding technique has the above advantages, up to now, the laser welding technique is almost never adapted for the fabrication of the structural body due to the following reasons:

First of all, in comparison with a mechanical joining technique using bolts and nuts, the laser welding technique can fabricate a small structural body through its welding, and enhance the fabrication efficiency, but it has complicate weld processing phenomena, so that it is difficult to judge welding quality in the laser welding technique by visual inspection. Therefore, a nondestructive test or a destructive test using various equipment is required, and sometimes, durability evaluation or environment-resistance evaluation is required. As a result, the laser welding technique takes much time in the evaluation of the welding quality.

Moreover, in the laser welding technique, since the laser beams having spot diameters of not more than 1 mm are employed, the welded bead width becomes very small. Therefore, the clearance between the members to be welded must be controlled high precisely. In addition, since the welding quality may be influenced by the fluctuation in the sizes of the members to be welded and the slight difference in the weld processing condition, the sizes of the members and the weld processing condition must be monitored severely. Moreover, in the laser welding technique, since the laser beams to be used have small spot sizes, they must be moved along a seam line high precisely, and thus, the position of the laser beam must be controlled and determined high precisely. In view of the precise control and determination of the laser beam position, it is tried to make the parts to constitute the laser welding apparatus precisely and provide jigs on the laser welding apparatus. Moreover, it is also tried to feedback control the welding position by a sensor. However, the above means require large cost, and can not be applied for various purposes.

Moreover, although in the laser welding technique, the welding process can be carried out under an atmospheric air, which can not be performed in the electron beam welding technique, the atmospheric welding may form oxide films and segregation compounds at the welded parts of the members to be welded made of a metallic material through their oxidization. Therefore, if an ultrahigh-vacuum apparatus such as a scanning electron microscope or a spin electron microscope to observe a nm-order magnetic condition in a magnetic film is fabricated by the above atmospheric welding process, various gases may be emitted from oxide films and segregation compounds formed at the welded parts of the apparatus, and degrade the reliability of the apparatus. Accordingly, it is required to repress the formation of the oxide films and the segregation compounds to the minimum.

Conventionally, for preventing the formation of the oxide films and the segregation compounds, each part to be welded is set in a steel case, and thereafter, the steel case is evacuated and the laser welding process is performed in the steel case having anti-oxide shielding gas atmosphere. However, this conventional method requires large and complicate apparatus.

SUMMARY OF THE INVENTION

It is an object of the present invention to provide a laser welding apparatus, a gas shielding apparatus and a method for controlling a laser welding apparatus which can take advantage of the laser welding technique without the above-mentioned matters, and can be employed in fabricating such an ultrahigh-vacuum apparatus as a scanning electron microscope, a spin electron microscope or an electron spin analyzer to be attached the electron microscope.

For achieving the above object, this invention relates to a laser welding apparatus comprising a laser welding head and a laser welding head position-controlling apparatus, the laser welding head including a laser irradiating body with an inert gas nozzle to blow off an inert gas for welding parts of members to be welded and at least one shielding gas nozzle, at the outside of the inert gas nozzle, to blow off a shielding gas for the surrounding area of the welding parts, and plural semiconductor lasers to oscillate plural linear laser beams for measuring the welding state of the members to be welded, the laser welding head position-controlling apparatus including an imaging apparatus with a band-pass filter therein to pass through only the reflected linear laser beams to take in, as an image, the measured welding state by the reflected linear laser beams, and an image processor to process the image of the measured welding state.

Herein, the wording "semiconductor laser" also includes "semiconductor light-emitting element".

Moreover, this invention relates to a gas shielding apparatus for laser welding comprising an inert gas nozzle to blow off an inert gas for welding parts of members to be welded and at least one shielding gas nozzle, at the outside of the inert gas nozzle, to blow off a shielding gas for the surrounding area of the welding parts Furthermore, this invention relates to a method for controlling a laser welding apparatus comprising the steps of:

irradiating plural linear laser beams for welding parts of members to be welded from plural semiconductor lasers provided on the laser welding apparatus, accepting, as an image, the reflected linear laser beams from the welding parts into an imaging apparatus provided on the laser welding apparatus, processing the image in an image processor provided on the laser welding apparatus, calculating the state of the welding parts on the processed image, and controlling a laser welding head provided on the laser welding apparatus.

As mentioned above, since the laser beams to be used in the laser welding technique have spot sizes of not more than 1 mm, the gap between both members to be welded must be appropriately monitored, and the positions of the laser beams must be determined precisely.

Generally, in the laser welding process, the gap width to be able to be welded is within 10% of the thickness of each member to be welded or within 50% of the focused spot size of the laser beam, and the precision of the laser position is within one-third of the focused spot size. Therefore, for the appropriate laser welding process, the gap width must be monitored at high precision, and the laser beam trace must be carried out along a seam line at a position precision of not more than 5/100 mm. Moreover, the angle of the laser beam for the members to be welded and the height of the laser welding head must be controlled.

In the light of the above requirements, the laser welding head position-controlling apparatus is provided in the laser welding apparatus of the present invention. The laser welding head position-controlling apparatus includes the imaging apparatus with a band-pass filter therein and the image processor, and detects the welding state of the members to be welded such as a seam line trace, the height and the angle for the members to be welded.

Moreover, for reducing the calculation load of the welding state, it is desired to use CAD data for the members to be welded. That is, the shape and size of the crossing line or the crossing face between the members to be welded are calculated on the CAD data. On the other hand, the absolute position and angle of the laser welding head are calculated on the detected data. The CAD data and the detected data can be applied for NC data to perform the welding process. As a result, the operation time of the welding process can be shortened, and the reproducibility and the reliability of the welding process for the members having complicate shapes such as a sphere shape and a cylindrical shape can be enhanced.

Moreover, for preventing the formation of the oxide films and the segregation compounds in the welding process, a nozzle to blow off a shielding gas such as an anti-oxidizing gas in laminar flow for the welding parts of the members to be welded and its nearby parts is provided. In this case, since the welding process can be carried out while only the welding parts of the members to be welded are shielded almost perfectly against an outside air, the oxidization of the welding parts of the members can be prevented, and thus, the formation of the oxide films and segregation compounds can be repressed. As a result, a practical ultrahigh-vacuum apparatus and so on can be fabricated according to the present invention.

BRIEF DESCRIPTION OF THE DRAWINGS

For better understanding of the present invention, reference is made to the attached drawings, wherein.

DESCRIPTION OF THE PREFERRED EMBODIMENTS

This invention will be described in detail with reference to figures.

Figure 1:
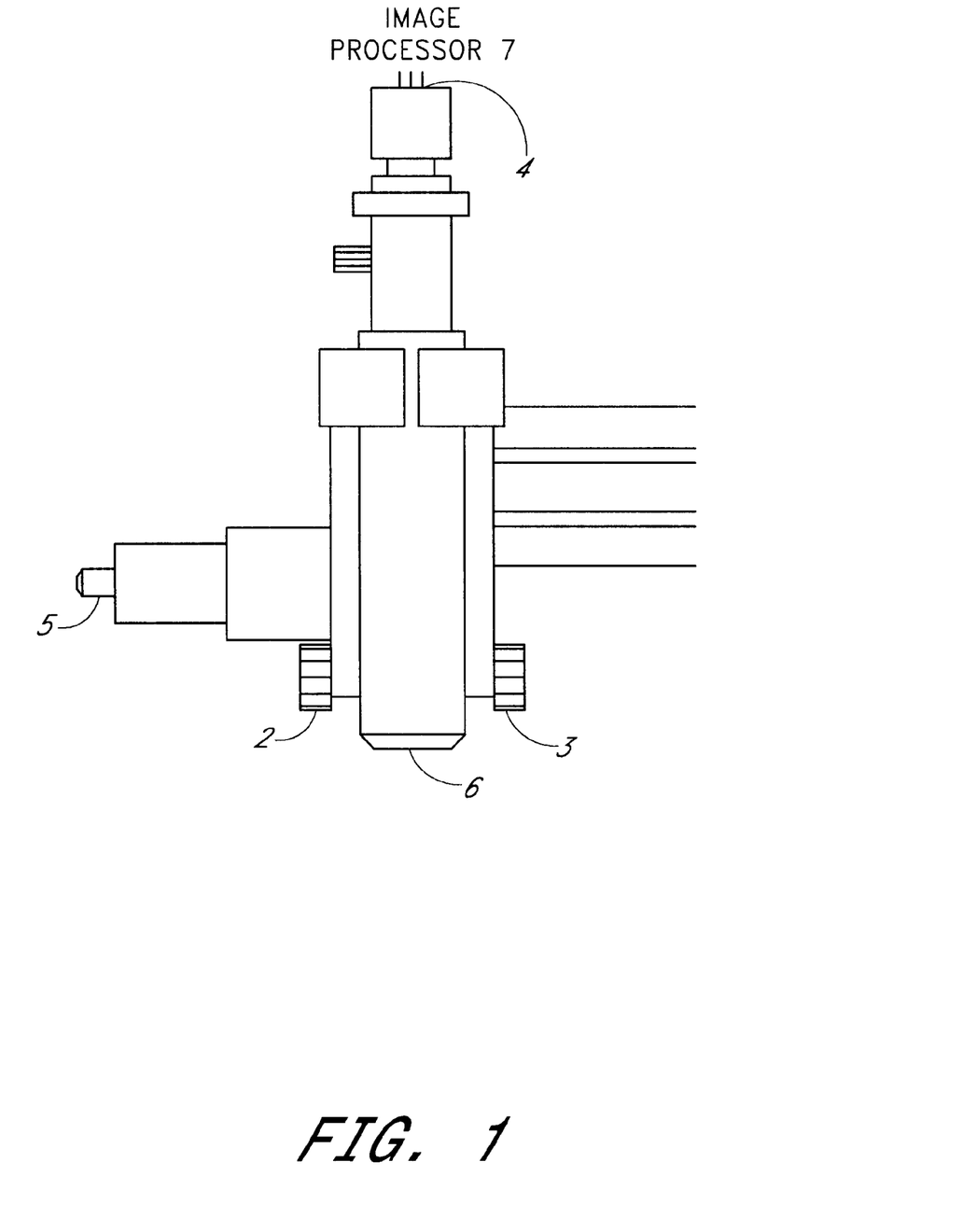
FIG. 1 is a structural view showing a laser welding head in the laser welding apparatus of the present invention.

FIG. 1 is a structural view showing a laser welding head in the laser welding apparatus of the present invention. The laser welding head depicted in FIG. 1 has a laser irradiating body 1 with a laser beam inlet 5 and a laser beam outlet 6, semiconductor lasers 2 and 3 as light sources to measure the welding state of members to be welded. Moreover, a CCD camera 4 as an imaging apparatus is attached to the laser welding head. The CCD camera 4 constitutes a laser welding head position-controlling apparatus in the laser welding apparatus of the present invention, and accepts the laser beams from the semiconductor lasers. The laser welding head position-controlling apparatus also has an image processor 7 to process the image. A laser beam from a laser oscillator (not shown), for example, a YAG laser is introduced into the laser beam inlet 5 through an optical fiber (not shown), and then, the thus obtained enlarged laser beam is focused in the laser irradiating body 1 and irradiated for the members to be welded from the, laser outlet 6.

The semiconductor lasers 2 and 3 irradiate their linear laser beams for the members to be welded, for example, at an oblique direction of 45 degrees for the members so that the linear laser beams can be orthogonal to a seam line. The CCD camera 4 detects the reflected laser beams from the members to be welded and thereby, takes in the image of the state of the members to be welded. Moreover, the CCD camera 4 has a band-pass filter therein to pass through only the laser beams from the semiconductor lasers, etc. and thereby, can detect only the reflected laser beams and take in the image without the disturbance of an outside light and a welding laser beam. The image is transmitted to the above image processor 7 provided on the laser welding head position-controlling apparatus, and processed therein to determine the distance between the linear laser beams, the relative and absolute positions of the linear laser beams, and the width and shape of each linear laser beam.

Figure 2:
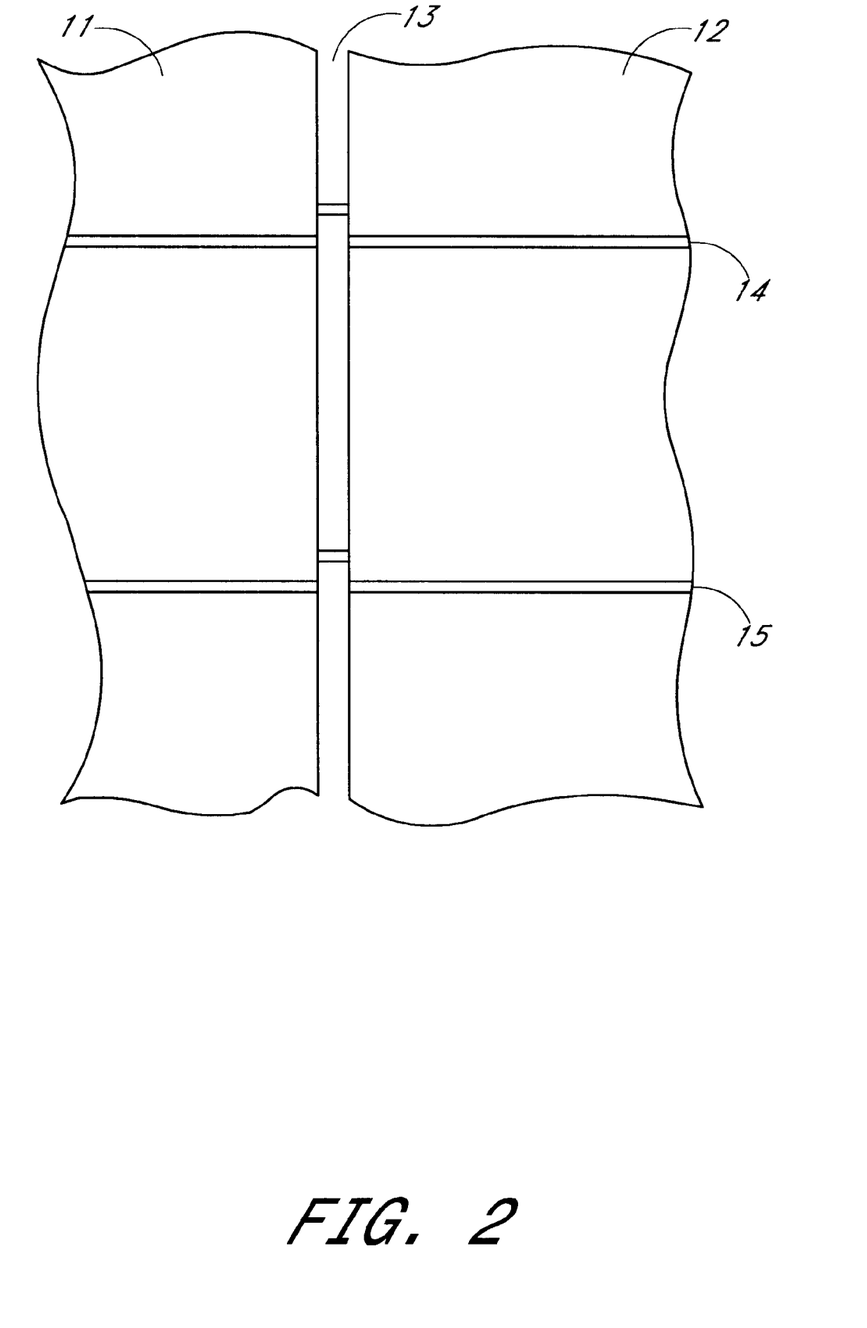
FIG. 2 is a plan view showing the state in which a laser welding process according to the present invention is being carried out.

FIG. 2 is a plan view showing the state of the surfaces of members 11 and 12 to be welded. In this embodiment, a butt welding process is carried out, so the members 11 and 12 are separated and arranged by a space 13. When linear laser beams 14 and 15 are irradiated onto the members 11 and 12 at an oblique direction of 45 degrees, they are disconnected at the space 13. When the disconnected state of the irradiated linear laser beams is photographed by the CCD camera 4, the image of the disconnected state is processed in the image processor, and the crossing points between the edges of the members 11, 12 and the linear laser beams 14, 15 can be calculated and determined on the processed image. If the welding process is to be carried out linearly, the seam line is determined by the crossing points. Since the linear laser beams are irradiated at the oblique direction, the inclination of the surfaces of the members 11 and 12 are determined by the widths of the linear laser beams, and the heights of the surfaces of the members are determined by the absolute positions of the linear laser beams. In this way, the configurations, the inclinations, the heights and the positions of the surfaces of the members to be welded and the seam line are determined by the distance between the linear laser beams, the relative and absolute positions of the linear laser beams, and the width and shape of each linear laser beam.

In the above welding process, it is desired that the shape and size of the crossing line or the crossing face between the members to be welded are calculated and monitored by their CAD data, and the absolute position and angle of the crossing line or the crossing face are calculated and monitored by the above detected data. In this case, the laser welding head is controlled so that the welding laser beam can trace the seam line. The use of the CAD data enables the introduced image to be processed at a high speed and the welding operation time to be shortened. Moreover, the reproducibility and the reliability of the welding process for the members having complicate shapes such as a sphere shape and a cylindrical shape can be enhanced. Although in the above embodiment, two linear laser beams are used, three or over laser beams may be used.

Next, a gas shielding mechanism will be explained.

Figure 3:
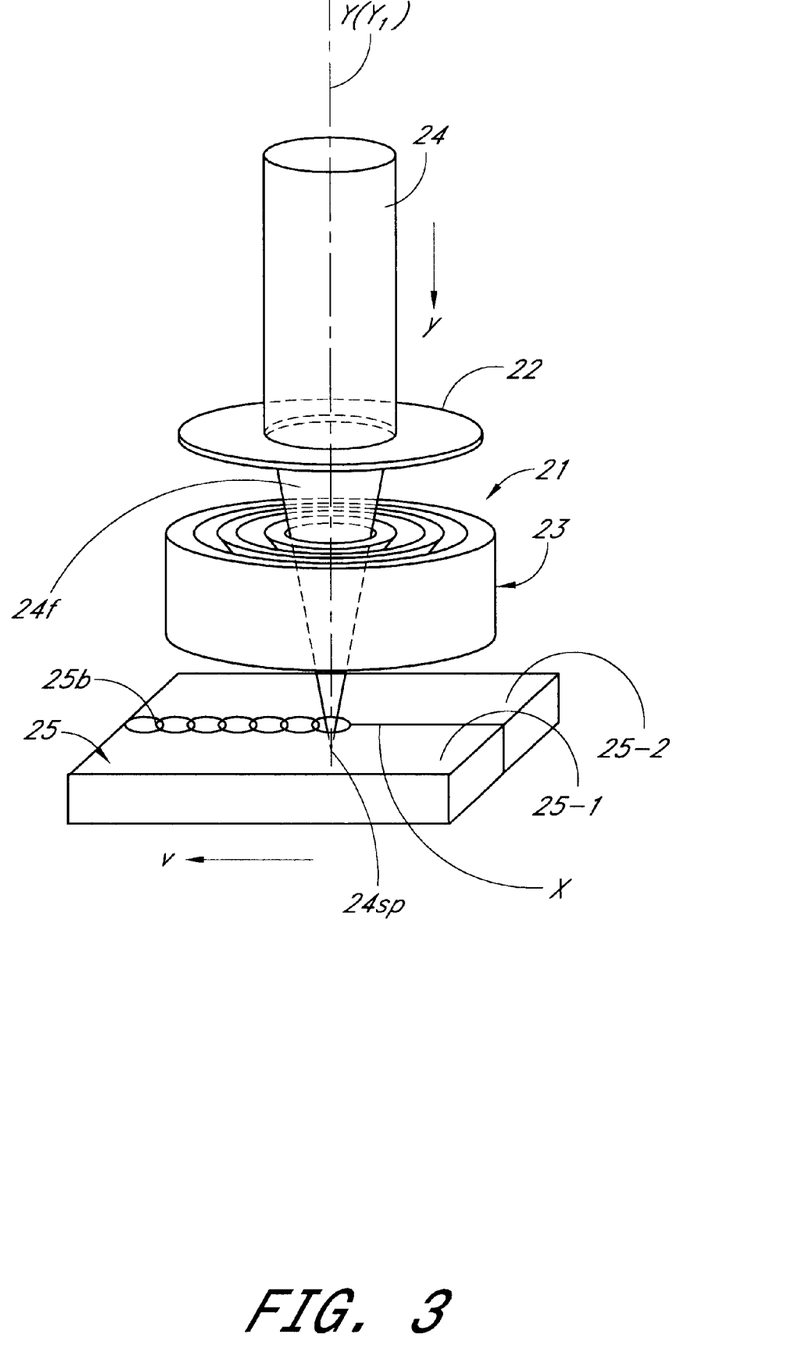
FIG. 3 is a structural view showing a substantial part of a laser welding head in the laser welding apparatus of the present invention.

FIG. 3 is a schematic view showing a substantial part of a laser welding head in the laser welding apparatus of the present invention. In FIG. 3, a laser welding head 21 has a converging lens 22 as a converging optical system and a nozzle 23 in its laser irradiating body. A laser beam 24 travelling in an arrow y direction is focused on planer members 25-1 and 25-2 to be butt-welded or its nearby area to form a focusing spot 24sp via the converging lens 22. The members 25-1 and 25-2 are locally melted by the irradiation of the laser beam 24. A mirror-based optical system may be employed as the converging optical system.

Figure 4:
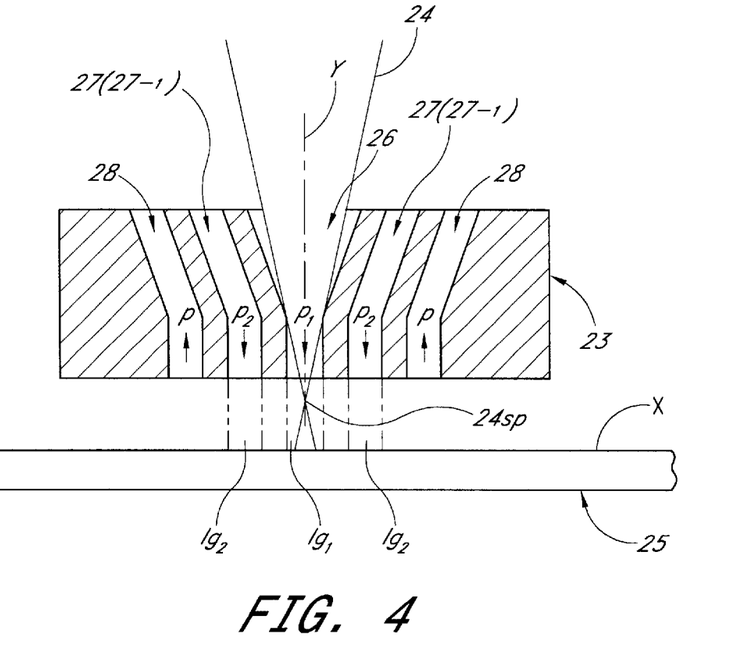
FIG. 4 is a cross sectional view showing the laser irradiating opening of the laser welding head depicted in FIG. 3.
Figure 5:
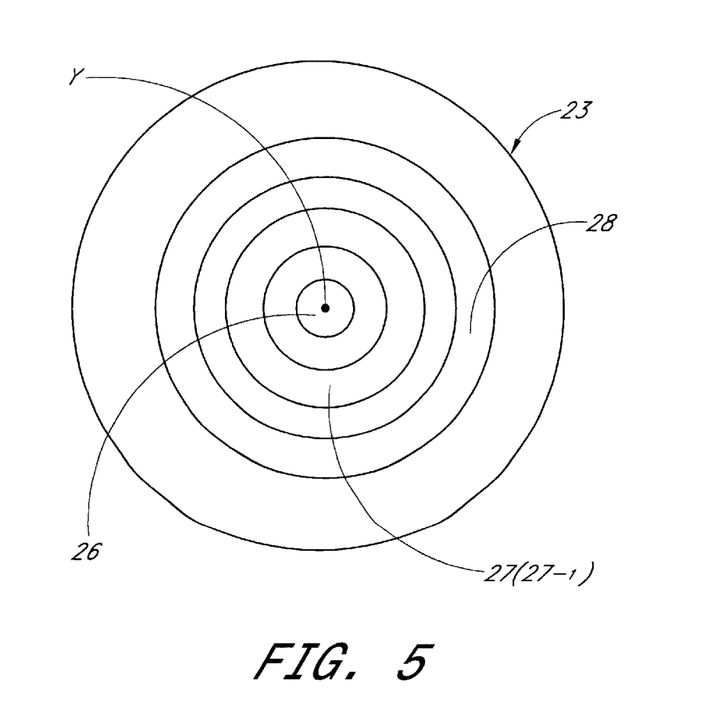
FIG. 5 is a plane view showing the laser irradiating opening of FIG. 4.

FIGS. 4 and 5 are a cross sectional view and a plan view of the laser irradiating opening of the laser welding head 21, respectively. As shown in FIGS. 4 and 5, an inert gas nozzle 26 is provided at the center of the nozzle 23. The inert gas nozzle 26 serves as a converged laser beam-irradiating opening for the members 25-1 and 25-2 to be welded and a compressed inert gas-cylindrically blowing opening. In this case, the axis Y1 of the converged laser beam corresponds to the axis Y of the inert gas nozzle 26 substantially.

Figure 6:
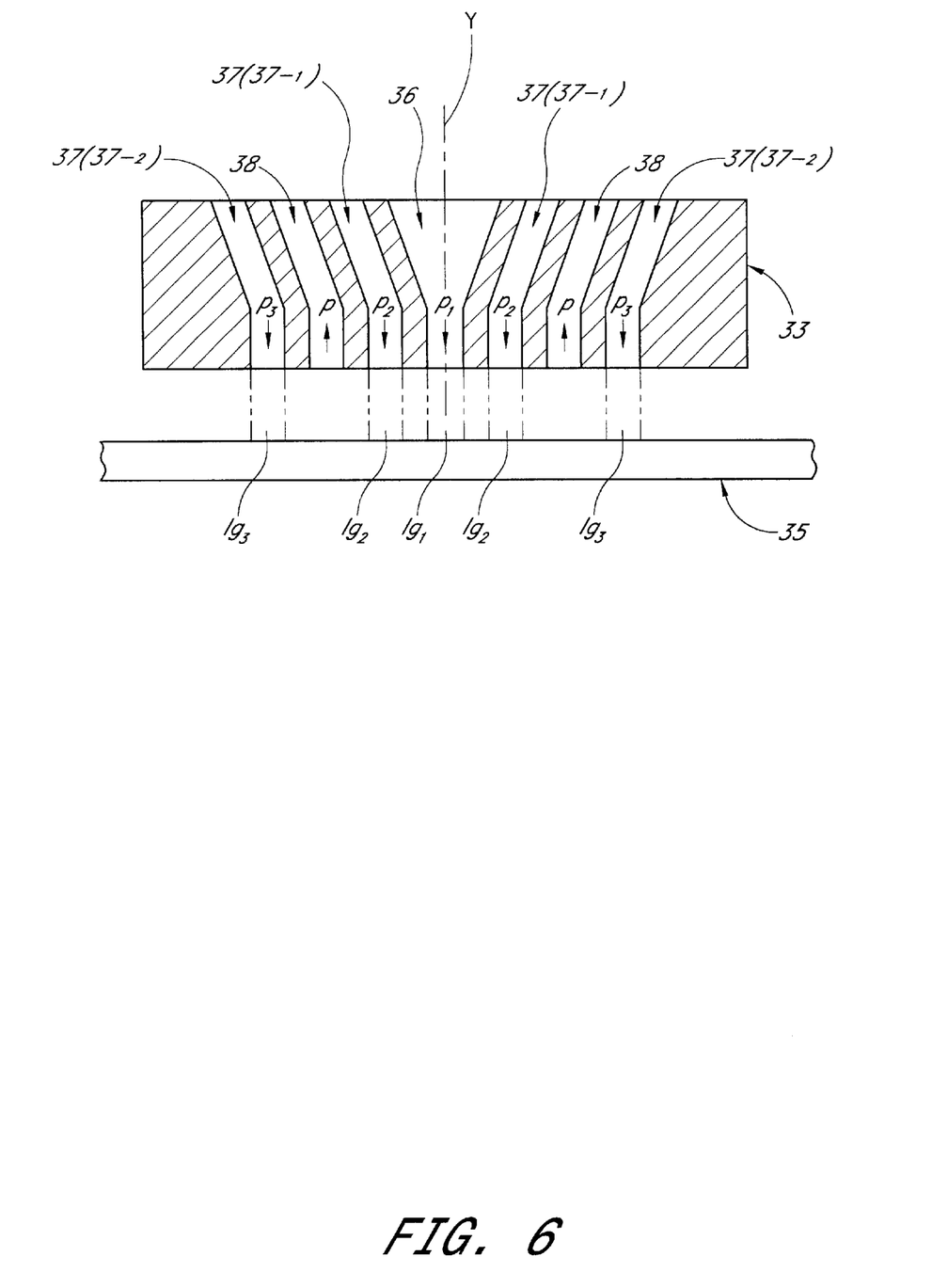
FIG. 6 is a cross sectional view showing the laser irradiating opening of another laser welding head in the laser welding apparatus of the present invention.

Moreover, at the outer side of the inert gas nozzle 26 is provided at least one shielding gas nozzle 27 concentrically. The shielding gas nozzle 27 blows a compressed shielding gas off for the welding parts of the members to be welded cylindrically. In FIGS. 4 and 5, one shielding gas nozzle 27-1 is provided. FIG. 6 shows another laser irradiating opening. In FIG. 6, a nozzle 33 has two shielding gas nozzles 37-1 and 37-2.

The laser welding process using the above gas shielding apparatus will be carried out as follows:

During the welding process, the laser beam 24 is oscillated from the laser oscillator (not shown) such as a $CO_2$ laser or a YAG laser, and is converged by the converging lens 22. The converged laser beam 24 is irradiated for the members 25-1 and 25-2 to be welded (a welding line X) through the inert gas nozzle 26 to melt the irradiated parts of the members 25-1 and 25-2. In this embodiment, the focused spot 24sp is formed slightly above or below the members to be welded.

At the same time of the laser beam irradiation, an inert gas $Ig_1$ with a regulated gauge pressure $p_1$ is blown off for the melting parts corresponding to the welding parts from the inert gas nozzle 26, and compressed shielding gases $Ig_2$ and $Ig_3$ with their respective regulated gauge pressures $p_2$ and $p_3$ are cylindrically blown off for the surrounding area of the melting parts in laminar flow.

In this case, the shielding gases $Ig_2$ and $Ig_3$ covers the inert gas $Ig_1$. Moreover, the gases $Ig_1$–$Ig_3$ are preferably supplied in continuous flow, and are preferably composed of $N_2$ gas, Ar gas or He gas. For forming a stable shielded state in between the nozzle and the members to be welded, it is desired to control the gauge pressures $p_1$–$p_3$ by a regulator so as to satisfy the relation of $p1>p2 \geq p3$. The shielding gases $Ig_2$ and $Ig_3$ blown off cylindrically from the nozzles 23 and 33 forms a strong barrier around the melting parts to be welded with the inert gas $Ig_1$ blown off cylindrically therefrom, and thereby, shields the melting area against an outside air. Moreover, since the gases are discharged outside after they are blown off onto the members 25-1 and 25-2 to be welded, gases to chemically react with the melting parts, particularly to oxidize the melting parts can be almost removed from the nearby area.

As a result, oxides or other chemical compounds are not formed at the welded parts (a bead 25b of FIG. 3 in this embodiment) of the members to be welded, and the formation of spatter can be repressed, so that the good quality welded parts can be obtained. Moreover, in this case, since the shielding process is performed by using the nozzle 23 or 33 built-in the laser welding head, another space is not required, so that the laser welding head can be downsized and made in low cost. And due to the small construction, small members can be precisely welded in good quality.

In this invention, it is desired to provide an evacuating nozzle 28 or 38 at the outside of the shielding gas nozzle 27 or the shielding gas nozzles 37. The evacuating nozzle sucks and evacuates gases such as the inert gas, the shielding gas and so on around the melting parts to be welded. Thereby, the inert gas and the shielding gas can be smoothly supplied and blown off onto the surrounding area of the melting parts to be welded, and thus, can shield the melting parts more perfectly from the outside air. Moreover, the turbulence of the gases around the melting parts is prevented, and thus, the diffusion and contamination of the gases for the melting parts can be repressed more effectively.

In the nozzle 33 having the two shielding gas nozzles 37-1 and 37-2 as shown in FIG. 6, the evacuating nozzle 38 is preferably provided between the nozzles 37-1 and 37-2 for developing the gas shielding effect.

As mentioned above, the inert gas nozzle and the gas shielding nozzle are provided concentrically, which leads to attaining the uniform gas shielding. Similarly, it is desired that the nozzles have their respective cylindrical openings.

As mentioned above, for shielding the melting parts to be welded against the outside air, the relation of $p1>p2 \geq p3$ is preferably satisfied.

Although the present invention was described in detail with reference to the above examples, this invention is not limited to the above disclosure and every kind of variation and modification may be made without departing from the scope of the present invention. For example, using plural welding heads as mentioned above, a good quality simultaneous multi-point spot welding can be performed precisely. Moreover, if the power of the welding laser beam is adjusted, a superposing welding and a deep welding may be performed.

As mentioned above, according to the present invention, the laser welding process can be performed high precisely. Moreover, since the formation of the oxides or segregation compounds at the melting parts to be welded of the members to be welded can be repressed, the welding process using the present invention can be applied for fabricating a ultrahigh-vacuum container requiring a vacuum degree of not more than $10^{-5}$ Pa, a hyperultra high-vacuum container requiring a vacuum degree of not more than $10^{-9}$ Pa, a Mott scattering detector and a small precise instrument used in the above ultrahigh-vacuum or hyperultra high-vacuum atmosphere.

Moreover, since the state of the members to be welded is monitored by the image from the reflected laser beam in the imaging apparatus, it can be done without the disturbance of an outside light and a welding laser beam. And if the CAD data for the members to be welded is employed in the image processing, the data from the image can be calculated fast.

What is claimed is:

1. A laser welding apparatus comprising a laser welding head and a laser welding head position-controlling apparatus,
   the laser welding head including a laser irradiating body with an inert gas nozzle to blow off an inert gas for welding parts of members to be welded and at least one shielding gas nozzle, at the outside of the inert gas nozzle, to blow off a shielding gas for the surrounding area of the welding parts, and plural semiconductor lasers to oscillate plural linear laser beams for measuring the welding state of the members to be welded, wherein the forefront of the shielding gas nozzle is formed in parallel to the forefront of the inert gas nozzle in a blowing direction,
   the laser welding head position-controlling apparatus including an imaging apparatus with a band-pass filter therein to pass through only the reflected linear laser beams to take in, as an image, the measured welding state by the reflected linear laser beams, and an image processor to process the image of the measured welding state.

2. A laser welding apparatus as defined in claim 1, wherein the laser welding head further includes a concentric evacuating nozzle at the outside of the inert gas nozzle.

3. A laser welding apparatus as defined in claim 2, wherein said shielding gas nozzle includes an inner shielding gas nozzle and an outer shielding gas nozzle, and said evacuating nozzle is provided between said inner shielding gas nozzle and said outer shielding gas nozzle.

4. A gas shielding apparatus for laser welding comprising an inert gas nozzle to blow off an inert gas for welding parts of members to be welded and at least one shielding gas nozzle, at the outside of the inert gas nozzle, to blow off a shielding gas for the surrounding area of the welding parts, wherein the forefront of the shielding gas nozzle is formed in parallel to the forefront of the inert gas nozzle in a blowing direction.

5. A method for controlling a laser welding apparatus comprising the steps of:
   irradiating a target area of members to be welded with a converged welding laser;
   emitting an inert gas toward the target area from an inert gas nozzle;
   emitting a shielding gas toward an area surrounding the target area from a shielding gas nozzle, said shielding gas being emitted around the inert gas, the forefront of said shielding gas nozzle being parallel to the forefront of said inert gas nozzle in a blowing direction;
   emitting plural linear laser beams for measuring a welding state of the welded parts of members, from plural semiconductor lasers provided on the laser welding apparatus,
   accepting, as an image, the reflected linear laser beams from the welding parts into an imaging apparatus provided on the laser welding apparatus,
   processing the image in an image processor provided on the laser welding apparatus,
   calculating the state of the welding parts on the processed image, and
   controlling a laser welding head provided on the laser welding apparatus.

6. A controlling method as defined in claim 5, wherein the state of the welding parts is calculated on their CAD data.

7. A laser welding apparatus for welding objects, comprising:
   a welding laser for welding the objects at a target area;
   an inert gas nozzle for emitting an inert gas toward the target area, said inert gas nozzle being disposed co-axially with the welding laser;
   at least one shielding gas nozzle for emitting a shielding gas toward an area surrounding the target area, said shielding gas nozzle being disposed around the inert gas nozzle, the forefront of said shielding gas nozzle being formed in parallel to the forefront of said inert gas nozzle in a blowing direction;
   at least two lasers for emitting linear laser beams at a predetermined angle toward the target area;
   an imaging apparatus provided with a band-pass filter, through which linear laser beams reflected by the objects pass exclusively, to generate an image of the target area; and
   an image processor for processing the image of the target area to determine the progress of welding, thereby controlling the position of the welding laser.

8. The apparatus according to claim 7, further comprising an evacuating nozzle for sucking gas disposed concentrically with the inert gas nozzle.

9. The apparatus according to claim 7, further comprising a CAD data system which stores CAD data of the objects, said data being used to control the position of the welding laser.

10. A method for welding objects, comprising the steps of:
    irradiating a target area of the objects with a converged welding laser;
    emitting an inert gas toward the target area from an inert gas nozzle;
    emitting a shielding gas toward an area surrounding the target area from a shielding gas nozzle, said shielding gas being emitted around the inert gas, the forefront of said shielding gas nozzle being parallel to the forefront of said inert gas nozzle in a blowing direction;
    emitting at least two linear lasers beams at a predetermined angle toward the target area;
    generating an image of the target area exclusively from linear laser beams reflected by the objects passing through a band-pass filter;
    processing the image of the seam line to determine the progress of welding; and
    controlling the position of the welding laser.

11. The method according to claim 10, wherein the emitting pressure of the inert gas is greater than that of the shielding gas.

12. The method according to claim 10, further comprising using CAD data of the objects to control the position of the welding laser.

* * * * *